US007497201B2

(12) United States Patent
Hollenbeck

(10) Patent No.: US 7,497,201 B2
(45) Date of Patent: Mar. 3, 2009

(54) CONTROL SYSTEM AND METHOD FOR IMPROVING FUEL ECONOMY

(75) Inventor: Bruce Phelps Hollenbeck, Orefield, PA (US)

(73) Assignee: Mack Trucks, Inc., Allentown, PA (US)

( * ) Notice: Subject to any disclaimer, the term of this patent is extended or adjusted under 35 U.S.C. 154(b) by 143 days.

(21) Appl. No.: 10/579,758

(22) PCT Filed: Nov. 17, 2004

(86) PCT No.: PCT/US2004/038217

§ 371 (c)(1),
(2), (4) Date: Jan. 25, 2007

(87) PCT Pub. No.: WO2005/049996

PCT Pub. Date: Jun. 2, 2005

(65) Prior Publication Data

US 2007/0272216 A1 Nov. 29, 2007

Related U.S. Application Data

(60) Provisional application No. 60/520,651, filed on Nov. 18, 2003.

(51) Int. Cl.
*F02M 7/00* (2006.01)
*G06F 19/00* (2006.01)

(52) U.S. Cl. ....................... 123/435; 123/436; 701/114; 701/123

(58) Field of Classification Search ................. 123/434, 123/435, 436, 691; 701/103, 104, 110, 114, 701/115, 123
See application file for complete search history.

(56) References Cited

U.S. PATENT DOCUMENTS 4,319,327 A 3/1982 Higashiyama et al.
4,359,991 A 11/1982 Stumpp et al.
4,379,332 A 4/1983 Busser et al.
4,566,068 A 1/1986 Iwasake et al.
4,630,508 A 12/1986 Klatt
4,729,354 A * 3/1988 Tominaga et al. ........... 123/320
4,730,255 A 3/1988 Akiyama et al.
4,745,553 A 5/1988 Raven et al.
4,964,051 A 10/1990 Sekozawa et al.
4,984,540 A 1/1991 Morikawa
5,023,795 A 6/1991 Matsumura et al.
5,050,084 A 9/1991 Nakaniwa
5,268,842 A 12/1993 Marston et al.
5,319,558 A 6/1994 Nemoto et al.
5,367,462 A 11/1994 Klenk et al.
5,638,790 A 6/1997 Minowa et al.
5,709,196 A * 1/1998 Coleman et al. ............ 123/672
5,826,563 A * 10/1998 Patel et al. .................. 123/481
5,832,400 A 11/1998 Takahashi et al.

(Continued)

*Primary Examiner*—John T Kwon
(74) *Attorney, Agent, or Firm*—Martin Farrell

(57) ABSTRACT

A control system is provided for controlling the fueling system (402) of a combustion engine. The control system includes a sensing arrangement for measuring a plurality of engine and vehicle conditions (404, 406, 408, 410, 412) in real time. The control system also includes a fuel map that defines engine fueling parameters corresponding to engine operating conditions. The control system also includes a control module (102) that determines engine load from the sensed conditions, and controls the fueling parameters of the fueling system for optimized fuel consumption by selecting fueling parameters from the fuel map based on current engine load.

15 Claims, 4 Drawing Sheets

U.S. PATENT DOCUMENTS 5,857,445 A 1/1999 Shimada et al.
5,983,156 A 11/1999 Andrews
6,151,549 A 11/2000 Andrews et al.
6,340,014 B1 * 1/2002 Tomita et al. ............... 123/295
6,701,897 B2 3/2004 Chatfield
6,705,278 B2 * 3/2004 McGee et al. ............... 123/299
6,725,825 B1 4/2004 Kurtz et al.
6,755,179 B2 6/2004 Asakawa
2004/0002806 A1 1/2004 Belinger
2004/0024518 A1 2/2004 Boley et al.
2004/0069281 A1 4/2004 Corba

* cited by examiner

CONTROL SYSTEM AND METHOD FOR IMPROVING FUEL ECONOMY

CROSS-REFERENCE TO RELATED APPLICATIONS

This application is a National Phase of International Application Ser. No. PCT/US2004/038217, filed 17 Nov. 2004, which claims benefit of U.S. Provisional Application Ser. No. 60/520,651, filed 18 Nov. 2003.

BACKGROUND OF THE INVENTION

1. Field of the Invention

The invention relates to engine control systems, and in particular to engine control systems for controlling the fueling system in a combustion engine.

2. Description of the Related Art

Engine control systems for controlling fueling in combustion engines often utilize fuel maps, such as shown in FIG. 1, which define the amount of fuel to be supplied for an engine operating condition. In FIG. 1, the bold line 100*a* represents the rated power (i.e., brake power) of the engine, and the contoured wave lines 100*b* represent the amount of fuel metered per horsepower (lbs/hp/hr). The curves 100*a*-100*b* are graphed against engine speed in revolutions per minute (RPS).

In a typical engine, the lowest fuel consumption occurs at point A. This is the optimum operation point for the engine under heavy engine load conditions. As can be seen, the contour lines below point A have increased fueling requirements. However, if engine load conditions are light, then the optimum operating point is point B. The difference between point A and point B can be upwards of an eight percent difference in fuel economy and is further illustrated by example below.

Until recently, software and hardware technology were not capable of adjusting fuel flow based upon actual operating conditions. Fixed point operation was necessary, either point A or point B or some other fixed point, with the inherent trade offs in performance under all other operating conditions. Engines offered in the industry are currently available optimized at either point A or point B. Point A configured engines perform best under heavy load, but poorly when lightly loaded. Point B configured engines perform best when lightly loaded, but have poor fuel consumptions when heavily loaded. Such, fuel maps are often optimized for different operating conditions.

Engine parameters (e.g., A/F ratio, amount of fuel, etc.) currently are set for average conditions under which they operate. In other words, the engine is optimized for the average conditions that are predicted for its service and not for actual usage. This leads to compromises in engine fuel efficiency. The tendency is to optimize the engine to work at or near full load, which is represented by the published engine horsepower and torque curves. See FIG. 2.

Operation around the full load line represents operating conditions such as heavy acceleration, high payload or traversing steep grades. However, conditions exist where light engine loads are encountered, such as some vehicle operations under less than full cargo, at low cruising speeds, or flat or downhill road grades. Under these conditions, fuel is wasted because the best operating point in the engine is not at the conditions the vehicle is experiencing. For example, the Mack® E7 ASET engine is optimized for operation at close to 100% load. Other engines, available in the Heavy Duty industry, may be optimized for partial load operation, such as when the vehicle is pulling less than a truckload of freight.

An engine using a fuel map that is optimized for 100% load operation may deliver better fuel economy under demanding conditions, such a mountainous terrain, than an engine using a fuel map optimized for partial load operation. Conversely, using a fuel map optimized for partial load operation may deliver better fuel economy over flat terrain than one would using a fuel map optimized for 100% load operation. The probability that an engine developed for one set of operating conditions would be mis-applied to another set of operating conditions, however, is high.

Fuel economy tests were run for two similar trucks under mountainous and flat operating conditions that illustrate this point. The first truck was a Mack® CH outfitted with an E7 engine optimized for 100% load operation, and the second truck was a competitor outfitted with a competitor engine optimized for partial load operation. In a first test, the Mack® and the competitor were operational under identical operating conditions on a mountainous route from Richmond, Va. to Lexington, Ky. along U.S. Interstate 64. During this test, the Mack® achieved 6.5 miles per gallon (mpg) while the competitor achieved 6.27 mpg—3.5% lower fuel consumption than the Mack®.

In a second test, the Mack® and the competitor were operational under identical operating conditions on a flat route from Richmond, Va. to Atlanta Ga. along U.S. Interstate 95. The engines of each of the trucks were running at partial load during this test, outputting only approximately 150 horse power (hp) out of a maximum rated output of 350 hp. During this test, the Mack® achieved 6.95 miles per gallon (mpg) while the competitor achieved 7.32 mpg—5.3% higher fuel economy than the Mack®.

As can be clearly seen from the experiment, the first and second trucks respectively out performed each other in the first and second tests. Thus, there is a need for improved engine control that does not depend upon a single fuel map or is not optimized for a single set of operating conditions.

SUMMARY OF THE INVENTION

The present invention includes a control system and methods for continuously adapting engine control parameters to optimize and adjust engine fuel consumption based upon all detectable vehicle and engine operating conditions. Engine fuel flow can be adjusted based on limitless factors, such as how hard the engine is requested to work, sensed driver commands, gross vehicle weight, road grade and road speed demand.

In one embodiment, a large number of fuel maps, tailored for each conceived condition, can be utilized to optimize engine fuel consumption based upon rapidly changing conditions. For example, a CD changer could be implemented for storing and retrieving fuel maps. In another embodiment, a fuel map or fuel maps may be used as a basis for calculating amount of fuel to be injected into the cylinder. However, the amount of fuel is adjusted in real time based on a plurality of vehicle and engine operating conditions. Alternatively, fuel maps may be calculated interactively "on the fly."

When the operating point moves, the fuel map also moves to maintain the operation within the "sweet spot", the point of Fuel Economy optimization, and the corresponding topography of the fuel map changes.

According to an embodiment in the present invention, a fuel control system for a combustion engine in a motor vehicle is provided. The fuel control system includes a plurality of sensors that measure a plurality of vehicle and engine operating conditions. The fuel control system also includes an electronic control module (ECM) coupled with a plurality of sensors and with a fuel system. The ECM is configured to receive measurements from the plurality of sensors and to adjust fueling parameters of the fuel system to optimize the operation of the combustion engine based on the measurements.

According to another embodiment in the present invention, a method of controlling the fuel system of a combustion engine in a vehicle is provided. The method includes a step of measuring a plurality of engine and vehicle operating conditions. Fueling parameters of the fuel system are adjusted based upon the measurements made in order to optimize the output power of the engine for maximum fuel efficiency.

According to another embodiment in the present invention, a control system for a fueling system of a combustion engine is provided. The control system includes sensing means for measuring a plurality of engine and vehicle conditions in real time. The control system also includes a fuel map that defines engine fueling parameters corresponding to engine operating conditions. The control system also includes a control module means for controlling the fueling parameters of the fueling system by selecting fueling parameters from the fuel map based on current engine operating conditions and adjusting the selected fueling parameters based on the plurality of engine and vehicle conditions measured by the sensing means.

Further applications and advantages of various embodiments of the present invention are discussed below with reference to the drawing figures.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

It is desirable that the performance of an engine be optimized for a variety of operating and load conditions under which it may operate. It is further desirable for the performance of an engine to be adaptable to a wide variety of road conditions under which it may operate. Finally, it is desirable for an engine to be optimizable to operate at maximum performance for all possible operating conditions. To that end, the present invention includes systems and methods for controlling a fuel system of a combustion engine, in real-time, based on engine and vehicle operating conditions.

Figure 4:
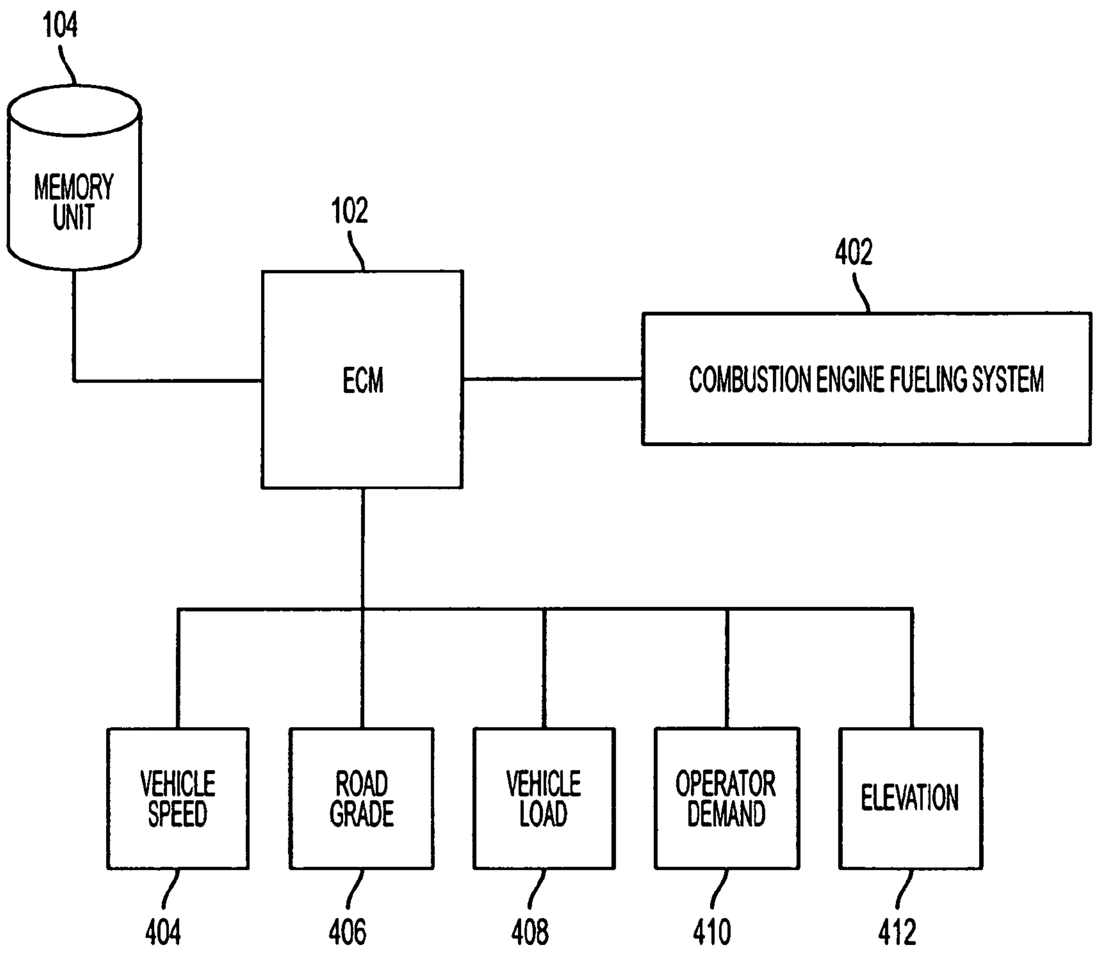
FIG. 4 is a block diagram of an engine control system according to an embodiment of the present invention.

FIG. 4 is a block diagram of an engine control system according to an embodiment of the present invention. System 400 includes an electronic control module (ECM) 102 coupled with a memory device 104, with the various components of the combustion engine fueling system 402, and a plurality of engine and vehicle sensors 404-412. Any number of engine and vehicle sensors may be employed in the present invention. For example, sensors can include those that determine vehicle speed 404, road grade 406, vehicle load 408, operator demand 410 and elevation 412. Sensors could include accelerometers, temperature sensors, gyroscopes, etc. and are not limited to those described in this document. One skilled in the art will readily understand that most vehicles and engines already employ a number of sensors for measuring engine and vehicle conditions, such as oil temperature and pressure sensors, coolant temperature sensors, etc. Accordingly, the invention is not intended to be limited to the number and type of sensors as listed in FIG. 4.

Further, operating conditions can be deduced from other measurements. For example, road grade could be deduced from a combination of throttle position and road speed. If at a constant throttle and engine speed, there begins a deceleration, it could be inferred that a hill is being traversed.

ECM 102 is configured to receive data (i.e., measurements) from the plurality of sensors 404 to 412, access fueling data (e.g., fuel map data, brake power curve, etc.) stored on the memory unit 104, and control the various components of the combustion engine fueling system 402 associated with engine performance in order to optimize the operation of the combustion engine in real time, based on real time measurements, continuously and systematically.

Figure 3:
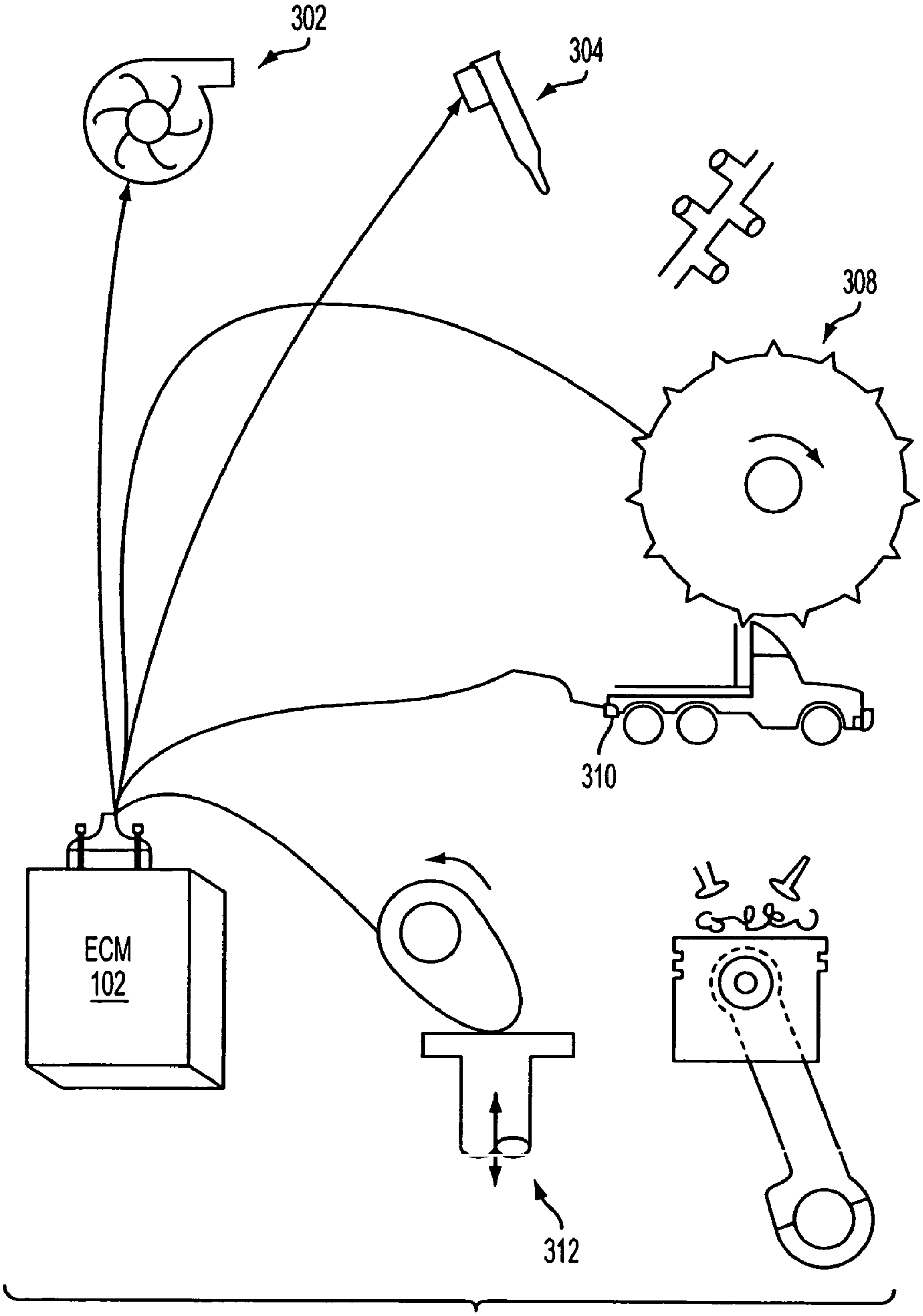
FIG. 3 is a diagram of an engine control system for use with an embodiment of the invention.

For example, referring to FIG. 3, ECM 102 could be further coupled with the systems that control the turbo charger (i.e., air delivery) 302, fuel injector (i.e., fuel delivery) 304, crank shaft position (which indicates engine speed 308, drive shaft speed 310, and valve timing 312. ECM 102 is configured to control turbo charger 302, fuel injection 304, and valve timing 312, based on real time data to optimize the performance of the engine at any given moment.

For example, ECM 102 could instantly measure GVW, vehicle speed, engine speed, the drivers fuel pedal (demand) and road grade and determine that, based upon the engines known characteristics, that a particular combination of fuel and air will achieve optimization of the engine at that instant, and accordingly control the turbo charger 302, fuel injection 304 and valve timing 312. The ECM 102 could include an algorithm or program that calculates "point A" of the Fuel Consumption Map, the point of optimization, based on the measured condition. For example, given a vehicle with a heavy payload traversing a hill, the ECM 102 shall calculate an optimum operating point close to the power curve, or near point A. As the vehicle ranges over the hill and starts to descend, the ECM 102 will recognize the decent and will recalculate the optimum point to move toward point B. Base on conditions, the engine could be controlled to operate at a higher or lower RPM for the road speed, with a particular air and fuel injection, in order to operate at maximum fuel efficiency.

In the next instant, if driver demand, road grade, or another condition changed, the ECM 102 would detect the change in vehicle and engine operating conditions and modify fueling parameters to optimize the engines performance for the next instance.

Figure 2:
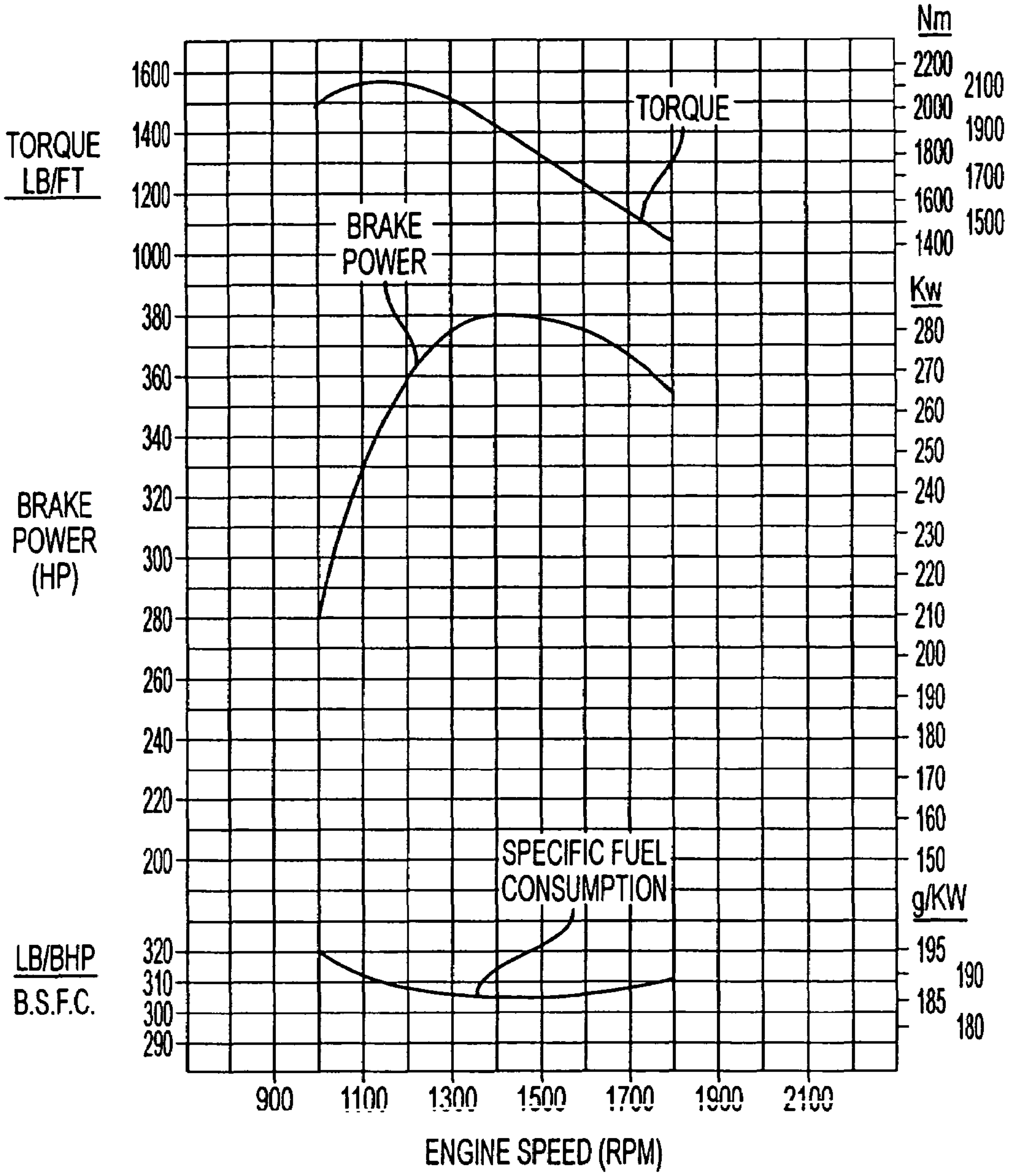
FIG. 2 is a graph of torque, brake power, and specific fuel consumption versus engine speed for use with an embodiment of the invention.

One skilled in the art will recognize that from the engine performance curve, such as that shown in FIG. 2, the power and torque can be correlated with an amount of specific fuel and air needed for combustion. Based on vehicle operating conditions, the present invention can determine how to meet the driver's demands while optimizing performance and fuel consumption. However, the ECM might calculate that a particular combustion state would be most efficient, such as lean burn states, but would be operating outside of EPA regulation for emissions. Therefore, the ECM can be bounded by current EPA regulations so that maximum fuel efficiency is met within emissions standards.

One skilled in the art will recognize that system 302-312 may also input measurements to the ECM 102 that can be used to control fueling.

ECM memory 104 can include the data necessary for creating fuel map "on the fly," or alternatively, could include a large number of fuel maps, each of which are optimized for a certain condition. For example, based on instantaneous vehicle and engine conditions, the ECM 102 could select a fuel map from a plurality of fuel maps, each of which is optimized for the particular road and vehicle conditions. Fueling could then be performed based on the selected fuel map. In order to accommodate the amount required for a large number fuel maps, memory 104 could include a "juke box" or CD changer.

Figure 1:
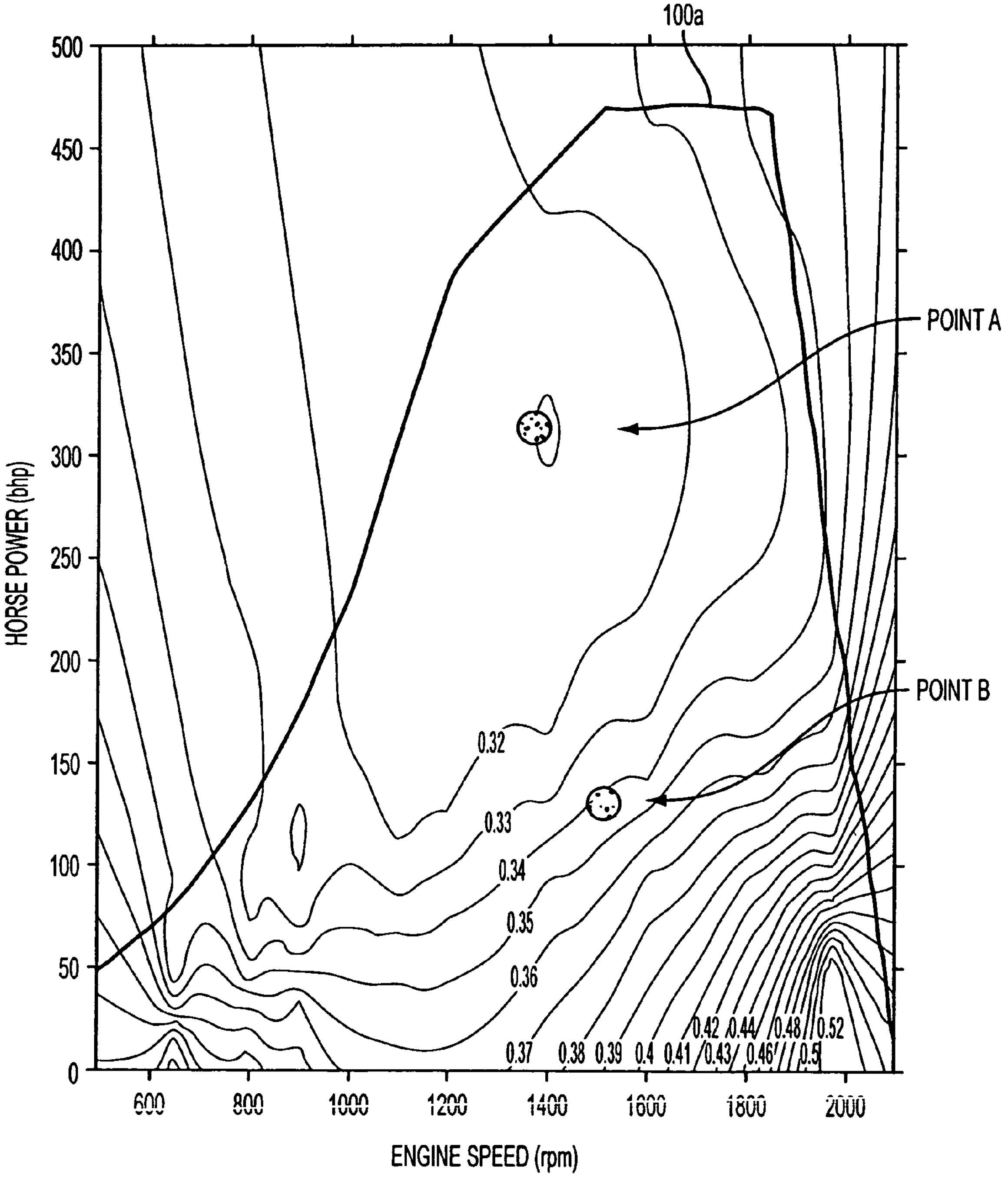
FIG. 1 is a fuel map for use with an embodiment of the invention.

Alternatively, a single fuel map could be stored in the memory unit, ECM could be configured to obtain the fueling parameters from the fuel map and adjust the fueling parameters obtained from the fuel map based on the real time measurements from a plurality of sensors. For example, referring back to FIG. 1, adjustments could be made between Point A and Point B in order to optimize the engine operation.

In one embodiment of the present invention, a memory unit 104 could comprise a CD changer. Multiple fuel maps could be loaded in the software like discs in a CD changer. For example, ninety-nine separate fuel maps may be stored. The ECM 102 may calculate what conditions or which application the engine is operating under, such as mountainous terrain, flat terrain, high gross vehicle weight (GVW), or low GVW based upon inputs like turbocharger speed 302, injector delivery volume 304, engine speed 308, vehicle speed 310, or variable valve timing 312, as shown in FIG. 3.

The ECM 102 then can select the appropriate "disc" or fuel map and load it to operate the engine. When application conditions change, a new disc could chosen by the changer and loaded. In practice, the various fuel maps may be stored in memory. If enough discs are available to drive efficient operation this approach will match fuel delivery to the engine operating conditions. It is recognized that this approach may be expensive because of the costs necessary to develop each of the fuel maps independently.

In another embodiment, the control system can adapt engine control parameters continuously and infinitely to adjust engine fuel consumption based upon the various operating conditions experienced by the vehicle. This embodiment is particularly applicable to a commercial vehicle.

The control system can continuously adjust the fuel flow based on limitless numbers of factors such as how hard the engine is required to work, driver commands or intent, the GVW of the vehicle, road grade, and road speed demanded.

In one embodiment, interactive real time adjustments of the fuel maps may be developed with the changes to "not to exceed limits" imposed by EPA. In this embodiment, software control may be improved because the fuel map may be calculated interactively or "on the fly". This embodiment may require inputs from additional sensors and controls of other devices such as variable geometry turbochargers (which control engine airflow). In this embodiment, application optimization may be continuous and optimized under all conditions.

Thus, a number of preferred embodiments have been fully described above with reference to the drawing figures. Although the invention has been described based upon these preferred embodiments, it would be apparent to those of skilled in the art that certain modifications, variations, and alternative constructions would be apparent, while remaining within the spirit and scope of the invention.

I claim:

1. A method of controlling the fuel system of a combustion engine in a vehicle, said method comprising steps of:

(a) measuring a plurality of engine and vehicle operating conditions;

(b) determining an engine load status from the measured operating conditions;

(c) obtaining a fuel map for optimized fuel consumption for the determined engine load status; and, (d) adjusting fueling parameters of said fuel system based upon the fuel map to control the output power of said engine for optimized instantaneous fuel consumption.

2. The method as recited in claim 1, wherein said plurality of vehicle and engine operating conditions include gross vehicle weight (GVW), vehicle road speed, road grade, engine speed, and engine temperature.

3. The method as recited in claim 2, wherein in step (c), obtaining a fuel map includes obtaining a fuel map from a storage device.

4. The method as recited in claim 3, wherein in step (c), obtaining a fuel map includes calculating a fuel map for the engine load status.

5. The method as recited in claim 4, wherein said step of calculating a fuel map includes calculating a position of minimum instantaneous fuel consumption on a fuel map based on said measurements, and wherein said step of adjusting fueling parameters of said fuel system includes adjusting fueling parameters based on the calculated position.

6. The method as recited in claim 1, wherein in step (d), the fuel parameters being adjusted include an amount of air delivered to said fuel system, a crankshaft position, an engine timing, the vehicle speed, the engine output power, and fuel flow to the engine.

7. The method as recited in claim 1, wherein in steps (a) through (d) are performed in substantially real-time.

8. The method as recited in claim 1, wherein step (d) includes a step of limiting optimum fuel consumption to a minimum fuel consumption without said combustion engine generating an exhaust that exceeds EPA regulations.

9. A control system for a fueling system of a combustion engine comprising:

sensing means for measuring a plurality of engine and vehicle conditions in real-time;

a plurality of fuel maps each optimized for a different set of engine and vehicle operating conditions including engine load conditions; and a control module for receiving the measurements from the sensing means and determining a current engine load, for selecting one fuel map from said plurality of fuel maps based on said engine load for optimized fuel consumption for the engine load, and for controlling fueling parameters of said fueling system by selecting fueling parameters from said fuel map.

10. The control system as recited in claim 9, wherein said plurality of vehicle and engine operating conditions include gross vehicle weight (GVW), vehicle road speed, road grade, engine speed, and engine temperature.

11. The control system as recited in claim 9, wherein said control module controls an amount of air delivered to said fuel system, crankshaft position, engine timing, vehicle speed, engine output power, and fuel flow based on the adjusted fueling parameters.

12. The control system as recited in claim 9, wherein said control module adjusts said fueling parameters of said fuel system in real-time.

13. The control system as recited in claim 9, wherein said plurality of fuel maps are stored on a corresponding plurality of memory devices.

14. The control system as recited in claim 13, wherein said plurality of memory devices comprises CD or DVD disks.

15. The fuel control system as recited in claim 9, wherein said control module is further configured to adjust fueling parameters of said fuel system to optimize fuel consumption, the optimum fuel consumption being a minimum fuel consumption without said combustion engine generating an exhaust that exceeds EPA regulations.

* * * * *